Patented May 13, 1952

2,596,878

UNITED STATES PATENT OFFICE 2,596,878

PROCESS FOR THE PREPARATION OF HYDROHALOGENATED RUBBER

Gerardus Johannes van Veersen, The Hague, Netherlands, assignor to Rubber-Stichting, Delft, South Holland, Netherlands No Drawing. Application May 8, 1950, Serial No. 160,811. In the Netherlands June 12, 1947

10 Claims. (Cl. 260—771)

This invention relates to a process for the preparation of rubber hydrochloride by the hydrohalogenation of stabilized aqueous dispersions of rubber.

The principal object of the present invention is to provide a method for the production of hydrohalogenated rubber from aqueous dispersions of rubber. Another object of the invention is to provide a process for the preparation of uniformly hydrohalogenated rubber which does not require the use of solvents during the hydrohalogenation. A further object of this invention is to provide a procedure for the preparation of hydrohalogenated rubber from which aqueous dispersions of hydrohalogenated rubber may be obtained readily. Still another object of this invention is to provide a procedure for the preparation of hydrohalogenated rubber of very high molecular weight, low solubility and high chlorine content. Other objects of this invention include the provision of a rapid and economical process for the manufacture of hydrohalogenated rubber and aqueous dispersions thereof.

It is well known that rubber, in the form of sheet, crepe or reclaimed rubber milled to thin sheets, can be converted into hydrohalogenated rubber by subjecting it to the action of a hydrogen halide. The reaction is, however, difficulty controlled, and homogeneous products are not easily obtained.

Hydrohalogenated rubber has been prepared also by dissolving rubber in a solvent (e. g. benzene, carbon tetrachloride, chloroform) and passing hydrogen halide through the solution. The use of a solvent has the disadvantage that its complete recovery makes the process expensive; moreover the solutions are not very concentrated so that the yield per unit of volume of the reaction vessel is small. The rubber must be broken down to a considerable extent to enable the preparation of a sufficiently concentrated solution having a not too high viscosity. From this broken down rubber a hydrohalogenated rubber can only be prepared with a relatively low molecular weight.

From rubber which has not been broken down by mastication, as it is present in the latex such as Hevea latex, a hydrohalogenated rubber could not be prepared because coagulation takes place upon the introduction of a hydrogenhalide into the latex. The coagulum does not react readily with the hydrogen halide. It was stated by H. C. Baker, in the Proceedings of the Rubber Technology Conference, London, 1938, page 209, that rubber does not react with hydrochloric acid when large quantities of water are present.

In the operation of the process of the present invention, an aqueous dispersion of rubber is mixed with a material adapted to stabilize the dispersion against coagulation in the presence of a hydrogen halide, and a hydrogen halide is added to the dispersion in an amount greater than that required to saturate the aqueous phase of the dispersion at the temperature at which the hydro-halogenation is brought about. A dispersion of hydrohalogenated rubber is thereby obtained which gives, microscopically, the impression of unaltered latex. On chemical examination it appears, however, that a dispersion of the hydrohalogenated rubber has been formed. This dispersion can be purified by all kinds of purification methods known for latex.

My invention can be described in greater detail by reference to the following specific examples, which describe operating embodiments of my hydrohalogenating process. The first of these examples illustrates the preparation of hydrochlorinated rubber from a stabilized natural rubber latex, showing particularly the exceptionally high chlorine content which can be obtained by the process of the present invention:

EXAMPLE 1

Commercially available ammonia-preserved Hevea latex with a D. R. C. of 40% was diluted to a D. R. C. of 10%. A 50 ml. portion of the diluted latex was stabilized with 6 ml. of a 5% aqueous solution of cetyl pyridinium bromide. Subsequently hydrogen chloride gas was introduced into the mixture under cooling, until saturation, whereupon hydrogen chloride gas was slowly passed through the mixture for three days. The hydrochlorinated rubber latex was then treated with ethanol to coagulate the hydrochlorinated rubber, and the coagulum was separated, washed and dried. The chlorine content of the final product amounted to 33.5%, which is 99% of the theoretical value corresponding to the composition $C_5H_9Cl$.

EXAMPLE 2

This example illustrates the preparation of hydrochlorinated rubber from stabilized, concentrated Hevea latex. 17.5 ml. of a 10% aqueous solution of cetyl pyridinium bromide was added to 50 ml. of a preserved creamed latex having a D. R. C. of 60%. By this addition the latex acquired a pulpy consistency. With good stirring hydrogen chloride gas was introduced under cooling. After leading in hydrogen chloride for one hour the mixture was saturated with the gas, and after approximately 1½ hours the latex had become highly liquid. After slowly passing through hydrogen chloride gas for three days, the hydrochlorinated rubber was isolated. Chlorine content 28.9%.

EXAMPLE 3

This example illustrates the preparation of hydrochlorinated rubber from Hevea latex, stabilized with dodecyl phenyl polyglycolether. A 15 ml. portion of latex having a D. R. C. of 40% was stabilized by adding thereto 10 ml. of a 5% aqueous solution of "Igepal W," an emulsifier sold by the General Dyestuff Corp. and stated to be a dodecyl phenyl polyglycolether. 40 ml. of 4 N hydrochloric acid were added to the mixture and hydrogen chloride gas was passed through for 4 days. During the first three hours the reaction mixture was cooled. At the end of the reaction period the product was isolated by precipitation with ethanol, and dried. Chlorine content 33.0%.

EXAMPLE 4

This example illustrates the preparation of hydrochlorinated rubber from stabilized Hevea latex and hydrogen chloride whereby the hydrogen chloride is released from its aqueous solution by increasing the temperature of the saturated acid solution. A 33 ml. portion of a latex with a D. R. C. of 40% was stabilized by adding 100 ml. of a 1% aqueous solution of cetyl pyridium bromide. The resulting stabilized latex, having a D. R. C. of 10%, was cooled down to 0° C. and saturated with hydrogen chloride at that temperature. Portions of 25 ml. of the acid latex were sealed in glass tubes and heated. Test tubes were opened after predetermined time intervals and the contents analysed. The results of the heating at various temperatures and during various periods are indicated in the following table:

*Heating at 60° C.*

| Time of heating, in hours | 1 | 4 | 5.5 | 22 |
|---|---|---|---|---|
| Chlorine content (per cent by weight) | 18 | 29.3 | 29.2 | 33 |

*Heating at 90° C.*

| Time of heating, in hours | 0.17 | 0.33 | 0.5 | 1 | 6 | 22.5 |
|---|---|---|---|---|---|---|
| Chlorine content (per cent by weight) | 21.8 | 28.0 | 30.3 | 33.5 | 33.5 | 33.5 |

The same principle can be applied in the preparation of hydrochlorinated rubber at room temperature, provided that the aqueous phase has been saturated with hydrogen chloride at a temperature which is sufficiently low to allow the release of a sufficient amount of hydrogen chloride gas when the temperature is increased to room temperature.

EXAMPLE 5

This example illustrates the preparation of hydrochlorinated rubber from stabilized skim-latex, which is a by-product in the production of concentrated latex by centrifuging. Because of its low rubber content and the relatively large amounts of non-rubber constituents, a sufficiently pure rubber can hardly be manufactured from skim. By the process of the present invention economical means are provided for producing a hydrohalogenated rubber from this waste-product. To a 50 ml. portion of skim, having a D. R. C. of 5% were added 5 ml. of a 5% aqueous solution of cetyl pyridinium bromide. Hydrogen chloride gas was passed under cooling through the mixture and after saturation hydrogen chloride was slowly passed through for an additional 40 hours. After termination of the reaction, the product was coagulated with alcohol, washed and dried. Chlorine content 33.2%

EXAMPLE 6

This example illustrates the production of hydrobrominated rubber from a stabilized Hevea latex. A 100 ml. portion of latex, having a D. R. C. of 40%, was stabilized with 2.4 ml. of a 5% aqueous solution of cetyl pyridinium bromide. 10 ml. of a 25% aqueous solution of hydrobromic acid were added to the stabilized latex, whereupon hydrogen bromide gas is passed through the mixture for five hours under cooling with ice-water. The mixture is allowed to stand for a night, and then coagulated with ethanol. The product was filtered, washed and dried. The resulting white powder had a bromine content of 51.8%, which is 95.5% of the quantity which can be added theoretically.

EXAMPLE 7

This example illustrates the production of hydrochlorinated rubber from a stabilized Hevea latex, whereby the conditions during the hydrochlorinations are controlled in such a way that a product with a predetermined chlorine content can easily be obtained. The chlorine content of the reaction product can be increased by 1% per hour reaction period when hydrogen chloride gas is introduced at a predetermined rate into a Hevea latex, having a D. R. C. of 30% which has been stabilized against coagulation by acid. When the reaction is carried out at room temperature, at normal pressure and under stirring the rate of introduction of hydrogen chloride gas can easily be determined in a preliminary experiment. In the execution of this principle hydrogen chloride was passed for 24 hours through latex stabilized with cetyl dimethyl ethyl ammonium bromide in an amount of 2% calculated on the D. R. C. of the latex and previously saturated with hydrogen chloride. The reaction product contained 23.6% of chlorine.

EXAMPLE 8

This example illustrates the preparation of hydrochlorinated rubber from a stabilized, concentrated latex, showing the considerable speeding up of the reaction by the use of increased pressure and temperature. In an autoclave of acid resistant material of 15 l. contents were brought 10 l. of a stabilized latex having a D. R. C. of 50%. The latex was heated at 90° C. and the pressure was simultaneously brought to 25 at using a bomb containing hydrogen chloride under pressure. 25 minutes after the reaction mixture had reached 90° C., the reaction product was isolated and purified. 7.25 kg. of hydrochlorinated rubber, having a chlorine content of 33% were obtained.

EXAMPLE 9

This example illustrates the preparation of hydrochlorinated rubber from a stabilized, concentrated latex, whereby 2% (caculated on the D. R. C. of the latex) of the non-ionic stabilizer "Emulphor O," which is a reaction product of polyethylene oxide with oleyl alcohol, was used. To a 55 ml. portion of Hevea-latex having a D. R. C. of 60% were added 0.6 gram of "Emulphor O" in solid form. With intensive stirring hydrogen chloride gas was introduced. After passing hydrogen chloride gas slowly through the dispersion for five days, the hydrochlorinated rubber was isolated. Chlorine content 30.1%.

The same procedure can be applied to the hydrohalogenation of latices prepared from all unsaturated synthetic rubbers which are capable of being hydrohalogenated. These rubbers include rubbers prepared by the polymerization of isoprene, or of other 1,3-butadiene derivatives substituted with at least one methyl group, such as dimethylbutadiene and methylpentadiene, or by the copolymerization of isoprene with isobutylene. If it is desired to prepare rubber hydrochloride from synthetic latex, preferably a latex will be used which is obtained directly from the emulsion-polymerization process as an acid resistant latex because the polymerization is carried out in the presence of a suitable emulsifier which renders the latex non-coagulable upon the addition of acid. Consequently synthetic latices need not be expressly stabilized before the hydrochlorination when they have been produced by polymerization in aqueous emulsion in such a manner that the resulting latex is stable in acid medium. Artificial dispersions of natural or synthetic rubbers can also be used as a starting material, whereby the dispersions are preferably made acid resistant during the preparation by dispersing the rubber in a solution of a suitable emulsifier. Also vulcanized latex, white or yellow fraction latex or skim as obtained by creaming or centrifugal action, or coagulation serum or deproteinized latex can be used as a starting material. Deproteinized latex can e. g. be obtained by boiling with alkali hydroxides followed by dialysis, by decomposition of the proteins with bacteria, by adsorption displacement as is more fully described in the British Patent No. 586,830, and by other methods or by combination of various purification methods.

If an adsorption displacement step is employed it is possible to use as an adsorption displacement agent a material which will at the same time stabilize the latex in acid medium. A pretreatment with the purpose of making the latex acid resistant can then be omitted.

By "acid resistant latex" a latex is meant which does not coagulate by the addition of acid but in which possibly an agglomeration can occur.

It is evident that there are numerous factors which will influence conditions for the most satisfactory operation of the present invention, the actual limits of which cannot be established except by a detailed study of each set of starting materials and the intermediate and finished products involved.

The stabilizing agent required in my process is one which is capable of rendering the latex acid-resistant or incapable of being coagulated at all acid concentrations. The stabilizing agent is, of course, also subjected to the action of the acid hydrogenhalide and must be capable of withstanding its action without decomposing or losing its stabilizing effect. In some cases it may react with the acid to form another compound but the resulting reaction product must in that case also be a stabilizing agent. For example, if the stabilizing agent is a cationic soap, such as cetylpyridinium bromide, the bromide atom may be replaced to some extent by the chlorine ion when hydrochlorinated rubber is produced, provided that the so-formed soap is likewise a stabilizing agent. Thus, the stabilizing agent must be "acid-resistant" in the sense that its stabilizing action is not destroyed by acids. The term "acid-resistant stabilizer" in the following description and in the claims is used with this meaning. The stabilizing agent must, of course, also be sufficiently soluble in water to produce the desired effect.

The suitability of any stabilizing agent which is "acid resistant" in the sense described above, can easily be determined by a simple test. To natural rubber latex having a D. R. C. of not less than about 30% is added enough of the stabilizing agent to provide a concentration of not substantially more than 5% by weight. Hydrochloric acid is thereupon introduced into the latex, at room temperature, until the aqueous phase contains more than about 10% of HCl by weight. If the latex has not coagulated during the test, the stabilizing agent can be used in the process of the present invention.

Many chemicals which are referred to as stabilizing agents and which are capable of stabilizing latex to some extent cannot be used in the present process. Examples of these are ammonia, casein, hemoglobin and other similar materials and the anionic stabilizing agents. While highly dilute latices stabilized with some of these agents can be made slightly acid without coagulation, none is capable of rendering latex incapable of coagulation at all acid concentrations, especially the more concentrated latices which are advantageously employed in the present invention.

A large number of stabilizing agents are known which are capable of rendering latex stable against coagulation at the addition of any given quantity of acid. Those skilled in the art know how to produce such stabilized latices. Many of these agents fall within the class known as cationic soaps or cation active compounds. My tests indicate that all cation active soaps which are water-soluble and do not lose their emulsifying properties in strongly acid aqueous solution are operative in my process.

Cationic soaps can be defined as soaps the active principle (containing the hydrophobic fatty acid derivative) of which is positively charged and forms part of the cation, in contradistinction to ordinary soaps which are the sodium salts of fatty acids and in which the fatty acid radical is the anion. The fatty acid derivative produces the colloidal effect in both types of soaps.

Among the cationic soaps may be mentioned salts of quaternary ammonium bases and of tertiary amines, having the general formula:

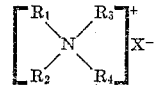

in which $R_1$ is a member of the group consisting of the alkyl, alpylol, aralkyl and aryl-alkylol radicals having at least 12 carbon atoms; $R_2$, $R_3$ and $R_4$ are members of the group consisting of hydrogen and the lower alkyl, aralkyl, aryl and heterocyclic radicals, including derivatives of these groups, such as alkyl sulphonate, alkylamine and alkylol radicals, which tend to increase the solubility in water of the salt, no more than one of the R's representing a hydrogen atom, and X is a member of the group consisting of the water-soluble anions.

Examples of suitable cationic emulsifiers are the bromide or chloride of the N-cetyl pyridinium ion, commercially available under the trade-name "Fixanol"; the acetate, hydrochloride or methosulfate of (dialkylamino ethyl)-fatty acid amides, known under the trade-name "Sapamine," the bromide of the cetyl dimethyl ethyl ammonium ion, commercially available under the trade-name "Ethyl Cetab"; and the soluble salts of the cetyl trimethyl ammonium ion, commercially available under the trade-names "Arquad" and "Lissolamine." Generally, every organic nitrogen compound wherein the nitrogen atom has a coordination number of 4, which is water-soluble, and where at least one of the substituents of the nitrogen atom contains a long chain hydrocarbon group and which is moreover acid resistant in the sense given above, is a suitable stabilizer in the process of my invention. These compounds are, however, not all equally effective. I prefer to use, as a cationic emulsifying agent, a compound which, when added in an amount of less than 5% (calculated on the D. R. C.) to the latex having a dry rubber content of at least 40%, is able to stabilize the latex during the hydrohalogenating process of my invention. I have found that the quaternary ammonium salts having a general formula as described above, but in which $R_2$, $R_3$ and $R_4$ are hydrocarbon groups with together not more than 8 carbon atoms, but which may form part of one cyclic hydrocarbon radical (as in the cetyl pyridinium ion) are especially effective in the stabilization of latex in the hydrohalogenating process of my invention. Other cationic soaps can also be used, but in that case the concentration of the soap in the latex should usually be somewhat higher than 5% (calculated on the D. R. C.), or a dilute latex should be used to prevent coagulation during the hydrohalogenating process.

I have also found that the so-called non-ionic emulsifying agents are operative in my process producing even more satisfactory results than the cationic soaps. A non-ionic emulsifying agent can be defined as a substance having emulsifying properties as a result of the presence, in the molecule of both hydrophilic and hydrophobic groups, the molecule of which does not split into ions when dissolved in water.

The non-ionic emulsifying agents which are particularly suitable in the process of the present invention are the compounds produced according to the Schoeller et al. Patent No. 1,970,578, patented August 21, 1934, by polymerizing ethylene oxide and condensing the polyoxy ethylenic compounds with fatty acid derivatives having an active hydrogen atom and more especially with aliphatic alcohols having more than 11 carbon atoms.

The products which are commercially available under the trade-names "Emulphor O"; "Vulcastab L. W."; "Mulgofen O"; "Cémulsol T"; "Igepal W" and "Tween" are believed to be produced in accordance with the methods outlined in this patent, whereby as fatty acid derivatives are used: oleylalcohol, alkylphenol, or a partial ester of hexitol anhydride and long chain fatty acids.

My tests have shown that all non-ionic emulsifying agents which are water soluble and do not lose their emulsifying properties in strongly acid solution are operative in my process.

The concentration of the non-ionic stabilizing agent in the latex can usually be lower than that of a cationic soap, to obtain the same degree of stabilization. It ranges from a concentration as low as about 1.5% (calculated on the dry rubber content) in the case of the condensation derivative of a polyglycol ether with oleyl-alcohol known under the trade-name "Emulphor O," to more than 10% in the case of numerous other, less suitable stabilizing agents. By reason of economy and of the undesirable properties which may be caused in the final product by the presence of a relatively large amount of stabilizing agent, I prefer to use those stabilizing agents which are capable of rendering the latex sufficiently stable when added in an amount not exceeding about 5% by weight.

The above list of operative stabilizing agents could be extended considerably. But since the art is aware of methods of producing latices which are incapable of coagulation by the addition of acid, it is not believed necessary to list additional stabilizing agents which are capable of producing these stabilized latices.

The introduction of a hydrogen halide into a stabilized rubber latex first produces a certain acid concentration in the aqueous phase. This acidification can also be effected with other inorganic or organic acids than the hydrogen halide, but this does not give any advantage since the latter can be regenerated from the serum, after removal of the hydrohalogenated rubber. The hydrogen halide only enters into reaction with the dispersed rubber globules or flocs if the water is completely saturated with the hydrogen halide; this point is reached after an introduction period which depends on the rate of introduction of the gas, the temperature, and the solubility of the specific hydrogen halide used. The rate of the addition of the hydrogen halide to the rubber depends on the pressure and the temperature. It is possible to control the starting point and the velocity of the reaction within very wide limits by varying these factors. In this manner a rubber hydrochloride having a predetermined chlorine content can be produced.

Satisfactory hydrohalogenating agents for use in the present process are hydrogen chloride and hydrogen bromide. The temperature during the hydrohalogenation process is preferably kept between 0 and 100° C., but temperatures above and below this range may also be used, if desired.

The form in which the hydrohalogenated rubber is present in the dispersion is determined by the extent of agglomeration of the hydrohalogenated rubber particles. If any substantial agglomeration occurs, the agglomerates formed may be dispersed readily.

Solid hydrohalogenated rubber can be recovered from the dispersion of hydrohalogenated rubber by precipitation, flocculation and/or sedimentation combined, if desired, with centrifuging or other methods of treatment. The separation of solid hydrohalogenated rubber may be effected by the addition to the dispersion of a precipitant which may be an organic non-solvent, such as alcohol, acetone, dioxane and the like. In contra-distinction to most commercial rubber hydrochlorides, the solid hydrohalogenated rubber recovered in this process is in a finely divided powder form, consisting of a uniformly hydrohalogenated rubber.

The precipitated and purified solid hydrohalogenated rubber may be dried and used directly in powder form, or the aqueous dispersion of hydrohalogenated rubber recovered in my process can be purified by any of the conventional methods used for purifying latex and then used as a hydrohalogenated rubber latex for industrial applications. The dried powder can also readily be dispersed in water, without heavy machinery being necessary for desintegrating the solid material.

In order to modify the properties of the hydrohalogenated rubber latex and of the hydrohalogenated rubber to be recovered therefrom, softeners, plasticizers, stabilizers, active or inert fillers, vulcanization ingredients, pigments and the like can be added to the original rubber latex, the hydrohalogenated rubber dispersion or the solid hydrohalogenated rubber.

The products made according to my invention differ from the hitherto prepared hydrohalogenated rubber, in that they have a higher molecular weight, which generally surpasses about 400,000. In separating rubber from latex, a certain degree of mastication has always to be applied. Especially when solutions are to be prepared, the rubber must be broken down to a considerable degree. This results in a decrease of the molecular weight of the final product to below 100,000, but also in a certain degree of oxidation which is generally believed to take place during plasticizing. By the removal of double bonds caused by the action of oxygen, less double bonds remain available for the addition of halogen halide; thus the theoretical amount of hydrogen halide which could be added when the formulae of rubber corresponded exactly to $(C_5H_8)_n$ has never been reached. The products produced by the known processes contain only 89–95% of chlorine; whereas the products prepared according to the process of my invention can easily be made with a chlorine content of 98–99%. The higher molecular weight makes the product of my invention especially suitable for the manufacture of films, coatings, adhesives and the like, having outstanding mechanical properties. As could be expected, the solubility of the high molecular weight rubber hydrochloride prepared according to my invention is considerably lower than of rubber hydrochloride prepared according to other processes; it is insoluble in carbon tetrachloride, but soluble in hot toluene. This decreased solubility of my product is an advantage when the product is used in a packaging material which should not be attacked by oils or solvents. Moreover, the high chlorine content which can be obtained by the hydrochlorination of unmasticated rubber according to my invention enhances the stability of the product. As is well known in the art, the stability of chlorine-containing rubber derivatives against decomposition and discolouration on heating increases with increasing chlorine content. A hydrochlorinated rubber containing over 33% of chorine can be heatd for a few minutes to about 160° C. without marked discolouration, whereas the rubber hydrochloride available up to now could only be heated to about 140° C. for a few minutes without decomposition becoming obvious.

The hydrohalogenated rubber produced according to my invention can advantageously be used in the production of shaped objects by applying heat and pressure to the material, compounded with pigments, plasticizers, fillers and the like. The product can also be used in the dispersed state, as well as in solution in the usual solvents such as benzene and chloroform after it has been broken down by milling.

This application is a continuation in part of co-pending application Serial No. 784,299, filed November 5, 1947, now abandoned.

What I claim is:

1. A process for the preparation of the addition product of rubber with a hydrogen halide selected from the group consisting of hydrogen chloride and hydrogen bromide, which comprises mixing an aqueous dispersion of a conjugated diolefin rubber and an emulsifying agent selected from a class consisting of nonionic and cationic surface active agents and which is capable, when added in a concentration of up to 5 per cent by weight to a natural rubber latex at room temperatures, of preventing coagulation of the latex by HCl when the latter is added thereto in concentrations of up to 10 per cent by weight, the quantity of emulsifying agent being sufficient to render the latex non-coagulable when saturated with hydrogen halide, saturating the aqueous phase of the dispersion with one of said hydrogen halides, then reacting the latex with an excess of the same hydrogen halide over the amount required to saturate the aqueous phase for a period of time sufficient to produce the desired degree of hydrohalogenation of the rubber and recovering the resulting hydrohalogenated rubber.

2. The process according to claim 1 wherein a cationic soap is mixed with the aqueous dispersion of rubber as a stabilizing agent.

3. The process according to claim 1 wherein a non-ionic emulsifying agent is mixed with the aqueous dispersion of rubber as a stabilizing agent.

4. The process according to claim 1 wherein a condensation product of polyethylene oxide with a higher aliphatic alcohol is mixed with the aqueous dispersion of rubber as a stabilizing agent.

5. The process according to claim 1 wherein the hydrohalogenated rubber is separated from the reaction mixture after the termination of the reaction.

6. The process according to claim 1 wherein the hydrohalogenated rubber is separated from the reaction mixture after the termination of the reaction, and the hydrohalogenated rubber is purified and converted into an aqueous dispersion thereof.

7. In the preparation of aqueous dispersions of an addition product of rubber with a hydrogen halide selected from the group consisting of hydrogen chloride and hydrogen bromide, the process which comprises stabilizing latex by the addition of a water soluble cationic soap which does not lose its emulsifying properties in strong aqueous acid solutions and which is a salt of a nitrogen compound having the general formula

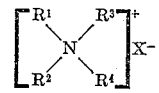

wherein $R^1$ is a member of the group consisting of the alkyl, alkylol, aralkyl and aryl-alkylol radicals having at least 12 carbon atoms; $R^2$, $R^3$ and $R^4$ are members of the group consisting of hydrogen and the lower alkyl, aralkyl, aryl and heterocyclic radicals, no more than one of $R^2$, $R^3$ and $R^4$ representing a hydrogen atom, while X represents a water-soluble anion, in amount sufficient to render the latex non-coagulable when saturated with hydrogen, saturating the aqueous phase of the latex with one of said hydrogen halides, then reacting the latex with an excess of the same hydrogen halide over the amount required to saturate the aqueous phase whereby an aqueous rubber-hydrohalide dispersion is obtained.

8. The process of claim 7 wherein the cationic soap is cetyl pyridinium bromide.

9. In the preparation of aqueous dispersions of an addition product of rubber with a hydrogen halide selected from the group consisting of hydrogen chloride and hydrogen bromide, the process which comprises stabilizing latex by the addition of a non-ionic emulsifying agent which is capable, when added in a concentration of up to 5 per cent by weight to a natural rubber latex at room temperatures, of preventing coagulation of the latex by HCl when the latter is added thereto in concentrations of up to 10 per cent by weight, in an amount sufficient to render the latex non-coagulable when saturated with hydrogen halide, saturating the aqueous phase of the latex with one of said hydrogen halides, then reacting the latex with an excess of the same hydrogen halide over the amount required to saturate the aqueous phase whereby an aqueous rubber hydrohalide dispersion is obtained.

10. In the preparation of aqueous dispersions of an addition product of rubber with a hydrogen halide selected from the group consisting of hydrogen chloride and hydrogen bromide, the process which comprises stabilizing latex by the addition of a condensation product of a polyethylene oxide with an aliphatic alcohol having more than 11 carbon atoms and which is capable, when added in a concentration of up to 5 per cent by weight to a natural rubber latex at room temperatures, of preventing coagulation of the latex by HCl when the latter is added thereto in concentrations of up to 10 per cent by weight, in an amount sufficient to render the latex noncoagulable when saturated with hydrogen halide, saturating the aqueous phase of the latex with one of said hydrogen halides, then reacting the latex, with an excess of the same hydrogen halide over the amount required to saturate the aqueous phase whereby an aqueous rubber hydrohalide dispersion is obtained.

GERARDUS JOHANNES van VEERSEN.

REFERENCES CITED

The following references are of record in the file of this patent:

UNITED STATES PATENTS

| Number | Name | Date |
|---|---|---|
| 1,491,265 | Hopkinson | Apr. 22, 1924 |
| 2,005,320 | Konrad et al. | June 18, 1935 |
| 2,164,367 | Winkelmann et al. | July 4, 1939 |

FOREIGN PATENTS

| Number | Country | Date |
|---|---|---|
| 476,743 | Great Britain | Dec. 15, 1937 |